US011866565B2

(12) United States Patent
Dehn et al.

(10) Patent No.: US 11,866,565 B2
(45) Date of Patent: Jan. 9, 2024

(54) POLYMER MATRIX COMPOSITES COMPRISING INTUMESCENT PARTICLES AND METHODS OF MAKING THE SAME

(71) Applicant: 3M INNOVATIVE PROPERTIES COMPANY, St. Paul, MN (US)

(72) Inventors: Derek J. Dehn, Maplewood, MN (US); Bharat R. Acharya, Woodbury, MN (US); Brandon A. Bartling, Woodbury, MN (US); Paul T. Hines, Prior Lake, MN (US); Clinton P. Waller, Jr., White Bear Lake, MN (US); Satinder K. Nayar, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 554 days.

(21) Appl. No.: 17/155,188

(22) Filed: Jan. 22, 2021

(65) Prior Publication Data
US 2021/0163702 A1 Jun. 3, 2021

Related U.S. Application Data

(62) Division of application No. 16/191,554, filed on Nov. 15, 2018, now Pat. No. 10,927,228.

(60) Provisional application No. 62/587,039, filed on Nov. 16, 2017.

(51) Int. Cl.
| | | |
|---|---|---|
| C08J 9/00 | (2006.01) | |
| C08J 3/14 | (2006.01) | |
| C08J 3/20 | (2006.01) | |
| C08L 101/14 | (2006.01) | |
| C08J 3/02 | (2006.01) | |
| C08K 3/34 | (2006.01) | |
| C08K 3/04 | (2006.01) | |
| C08K 3/22 | (2006.01) | |
| C08J 3/21 | (2006.01) | |

(52) U.S. Cl.
CPC ............. *C08J 9/0066* (2013.01); *C08J 3/14* (2013.01); *C08J 3/203* (2013.01); *C08J 3/212* (2013.01); *C08L 101/14* (2013.01); *C08J 2205/052* (2013.01); *C08J 2300/22* (2013.01); *C08J 2323/06* (2013.01); *C08K 3/04* (2013.01); *C08K 3/22* (2013.01); *C08K 3/346* (2013.01); *C08K 2003/2224* (2013.01); *C08K 2003/2227* (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 3,954,927 A | 5/1976 | Duling | |
| 4,539,256 A | 9/1985 | Shipman | |
| 4,791,037 A | 12/1988 | Anderman | |
| 4,833,172 A | 5/1989 | Schwarz | |
| 4,957,943 A | 9/1990 | McAllister | |
| 5,059,637 A | 10/1991 | Langer | |
| 5,120,154 A | 6/1992 | Lasch | |
| 5,292,840 A | 3/1994 | Heilmann | |
| 5,389,434 A | 2/1995 | Chamberlain | |
| 5,510,412 A | 4/1996 | Suzuki | |
| 5,567,757 A | 10/1996 | Szczepanski | |
| 5,643,511 A | 7/1997 | Pluyter | |
| 5,827,445 A | 10/1998 | Yoshida | |
| 5,828,940 A | 10/1998 | Learman | |
| 5,993,935 A | 11/1999 | Rasmussen | |
| 6,153,674 A | 11/2000 | Landen | |
| 6,171,689 B1 | 1/2001 | Kaylor | |
| 6,171,723 B1 | 1/2001 | Loch | |
| 6,183,668 B1 | 2/2001 | Debe | |
| 6,341,384 B1 | 1/2002 | Hayes | |
| 6,379,952 B1 | 4/2002 | Rasmussen | |
| 6,423,666 B1 | 7/2002 | Liao | |
| 6,458,418 B2 | 10/2002 | Langer | |
| 6,468,678 B1 | 10/2002 | Dahlin | |
| 6,524,742 B1 | 2/2003 | Emanuel | |
| 6,548,972 B2 | 4/2003 | Takagi | |
| 6,558,840 B1 | 5/2003 | Hikmet | |
| 6,562,448 B1 | 5/2003 | Chamberlain | |
| 6,692,799 B2 | 2/2004 | Waller, Jr. | |
| 6,820,382 B1 | 11/2004 | Chambers | |
| 7,229,683 B2 | 6/2007 | Fisher | |
| 7,582,684 B2 | 9/2009 | Rasmussen | |

(Continued)

FOREIGN PATENT DOCUMENTS

| | | | |
|---|---|---|---|
| JP | 11176680 | 7/1999 | |
| JP | 2002289414 | 10/2002 | |
| JP | 2011199574 | 10/2011 | |
| JP | 5522282 | 7/2013 | |
| KR | 20090122731 A | * 12/2009 | ............. C08L 23/12 |
| KR | 101627043 | 3/2016 | |

(Continued)

OTHER PUBLICATIONS

US 8,594,357 B1, 11/2013, Lin (withdrawn)
KR20090122731A, English Machine Translation, prepared Sep. 21, 2023. (Year: 2023).*
Baker-Jarvis, Dielectric and Magnetic Properties of Printed Wiring Boards and Other Substrate Materials, United States Department of Commerce National Institute of Standards and Technology (NIST) Technical Note, Mar. 1, 1999, vol. 1512, 84 pages.

(Continued)

*Primary Examiner* — Christopher M Rodd
(74) *Attorney, Agent, or Firm* — Thomas M. Spielbauer; Julie Lapos-Kuchar (57) ABSTRACT

Polymer matrix composite comprising a porous polymeric network; and a plurality of intumescent particles distributed within the polymeric network structure; wherein the intumescent particles are present in a range from 15 to 99 weight percent, based on the total weight of the intumescent particles and the polymer (excluding the solvent); and wherein the polymer matrix composite volumetrically expands at least 2 times its initial volume when exposed to at least one temperature greater than 135° C.; and methods for making the same. The polymer matrix composites are useful, for example, as fillers, thermally initiated fuses, and fire stop devices.

20 Claims, 4 Drawing Sheets

(56) References Cited

U.S. PATENT DOCUMENTS

| | | | |
|---|---|---|---|
| 7,674,835 | B2 | 3/2010 | Rasmussen |
| 7,674,836 | B2 | 3/2010 | Rasmussen |
| 7,682,536 | B2 | 3/2010 | Miller |
| 7,709,098 | B2 | 5/2010 | Yoda |
| 7,744,991 | B2 | 6/2010 | Fisher |
| 7,940,447 | B2 | 5/2011 | Wu |
| 7,953,240 | B2 | 5/2011 | Matsumura |
| 7,955,570 | B2 | 6/2011 | Insley |
| 8,080,210 | B2 | 12/2011 | Hornback, III |
| 8,265,330 | B2 | 9/2012 | Fukunishi |
| 8,292,023 | B2 | 10/2012 | Slotte |
| 8,314,046 | B2 | 11/2012 | Brady |
| 8,335,333 | B2 | 12/2012 | Saiki |
| 8,367,198 | B2 | 2/2013 | Wickert |
| 8,522,829 | B2 | 9/2013 | D'Souza |
| 8,592,493 | B2 | 11/2013 | Shannon |
| 8,687,836 | B2 | 4/2014 | Lin |
| 8,692,639 | B2 | 4/2014 | Baarman |
| 8,698,394 | B2 | 4/2014 | McCutcheon |
| 8,710,111 | B2 | 4/2014 | Wickert |
| 8,767,998 | B2 | 7/2014 | Imamura |
| 8,794,373 | B1 | 8/2014 | Lin |
| 8,885,863 | B2 | 11/2014 | Takashima |
| 8,942,402 | B2 | 1/2015 | Yuasa |
| 8,974,706 | B2 | 3/2015 | Somasiri |
| 9,018,267 | B2 | 4/2015 | Shannon |
| 9,056,316 | B2 | 6/2015 | Lawson |
| 9,105,382 | B2 | 8/2015 | Heikkila |
| 9,251,950 | B2 | 2/2016 | Hatanaka |
| 9,657,038 | B2 | 5/2017 | Griesgraber |
| 9,675,722 | B2 | 6/2017 | Ahimou |
| 9,681,996 | B2 | 6/2017 | Prioleau |
| 9,714,442 | B2 | 7/2017 | Sherman |
| 9,725,545 | B2 | 8/2017 | Wickert |
| 9,738,919 | B2 | 8/2017 | Mach |
| 9,759,663 | B2 | 9/2017 | Halverson |
| 9,772,321 | B2 | 9/2017 | Wendland |
| 2002/0078793 | A1 | 6/2002 | Holl |
| 2006/0099454 | A1 | 5/2006 | Morikoshi |
| 2007/0086965 | A1 | 4/2007 | Mohanty |
| 2007/0172640 | A1 | 7/2007 | Tahara |
| 2008/0018011 | A1 | 1/2008 | Gregg |
| 2011/0048844 | A1 | 3/2011 | Papakyriacou |
| 2011/0115429 | A1 | 5/2011 | Toivola |
| 2012/0183775 | A1 | 7/2012 | Shinba |
| 2013/0170687 | A1 | 7/2013 | Papakyriacou |
| 2013/0170690 | A1 | 7/2013 | Backman |
| 2014/0008974 | A1 | 1/2014 | Miyamoto |
| 2014/0254836 | A1 | 9/2014 | Tong |
| 2014/0309314 | A1 | 10/2014 | Sahouani |
| 2015/0099168 | A1 | 4/2015 | Guo |
| 2015/0235753 | A1 | 8/2015 | Chatani |
| 2016/0044838 | A1 | 2/2016 | Aga |
| 2016/0118711 | A1 | 4/2016 | Finn |
| 2017/0049926 | A1 | 2/2017 | Langer-Anderson |
| 2017/0117598 | A1 | 4/2017 | Matsushita |
| 2018/0038862 | A1 | 2/2018 | Kshirsagar |
| 2018/0174723 | A1 | 6/2018 | Acharya |

FOREIGN PATENT DOCUMENTS

| | | |
|---|---|---|
| WO | WO 1992-06577 | 4/1992 |
| WO | WO 2001-41213 | 6/2001 |
| WO | WO 2009-006254 | 1/2009 |
| WO | WO 2012-040032 | 3/2012 |
| WO | WO 2016-149233 | 9/2016 |
| WO | WO 2016-178120 | 11/2016 |

OTHER PUBLICATIONS

Ebnesajjad, "Table 11.34 Latent Solvents for Polyvinyl Fluoride," Fluoroplastics vol. 2: Melt Processible Fluoropolymers—the Definitive User's Guide and Data Book, 2nd Ed., Elsevier, p. 328. (Year: 2015).

Oswald, Materials Science and Polymers for Engineers, 494-496, (2012).

Schaller, "High-Performance Polyethylene Fibers "Al Dente": Improved Gel-Spinning of Ultrahigh Molecular Weight Polyethylene Using Vegetable Oils", Macromolecules, 2015, vol. 48, No. 24, pp. 8877-8884.

Small, "Closed-Box Loudspeaker Systems", Journal of the Audio Engineering Society, Dec. 1972, vol. 20, No. 10, pp. 798-808.

\* cited by examiner

POLYMER MATRIX COMPOSITES COMPRISING INTUMESCENT PARTICLES AND METHODS OF MAKING THE SAME

CROSS REFERENCE TO RELATED APPLICATION

This application is a divisional application of U.S. application Ser. No. 16/191,554, filed Nov. 15, 2018, which is claims the benefit of U.S. Provisional Patent Application No. 62/587,039, filed Nov. 16, 2017, the disclosure of which is incorporated by reference herein in its entirety.

BACKGROUND

Some pollution control elements and fire protection devices use intumescent materials in their construction. Intumescent materials have the ability to expand when exposed to elevated temperatures. Some intumescent materials expand due to chemicals that are imbibed within particles, while others expand due to the nature of the mineral or ore they contain. The temperature range at which the expansion occurs can vary depending on the intumescent material and/or the intercalated chemistry.

Porous films and membranes foams are generally made via a phase separation process, and therefore typically have relatively small, uniform, pore sizes, and different pore morphologies as compared to foams. The pores on porous films are typically open such that gas, liquid, or vapor can pass from one major surface though the open pores to the other opposed, major surface. They can be made via several phase separation processes, but are typically made via solvent induced phase separation or thermally induced phase separation.

Additional options to deliver or otherwise provide intumescent materials are desired.

SUMMARY

In one aspect, the present disclosure describes a polymer matrix composite comprising:
  a porous polymeric network structure; and
  a plurality of intumescent particles distributed within the polymeric network structure, wherein the intumescent particles are present in a range from 15 to 99 (in some embodiments, in a range from 25 to 98, 50 to 98, 75 to 98, or even 93 to 97) weight percent, based on the total weight of intumescent particles and the polymer (excluding any solvent); and wherein the polymer matrix composite volumetrically expands at least 2 times its initial volume when exposed to a temperature of at least 135 (in some embodiments, at least 150, 175, or even at least 200; in some embodiments, in a range from 135 to 400, or even 200 to 400) ° C. "Intumescent particles," as used herein refer, to particles that swell when exposed to heat. The result of exposure to heat is an increase in particle volume and a decrease in particle density. The change in particle volume and density can be tested in accordance of ASTM standard E2786 (2015), the disclosure of which is incorporated herein by reference.

In some embodiments, the percent volume expansion of the polymeric matrix composites is improved by compressing the polymeric matrix composite thereby increasing the density of the unexpanded polymer matrix composite.

In another aspect, the present disclosure describes a first method of making polymer matrix composites described herein, the method comprising:
  combining (e.g., mixing or blending) a thermoplastic polymer, a solvent, and a plurality of intumescent particles to provide a slurry;
  forming the slurry in to an article (e.g., a layer);
  heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent of the thermoplastic polymer, based on the total weight of the thermoplastic polymer; and
  inducing phase separation of the thermoplastic polymer from the solvent to provide the polymer matrix composite.

In another aspect, the present disclosure describes a second method of making polymer matrix composites described herein, the method comprising:
  combining (e.g., mixing or blending) a thermoplastic polymer, a solvent for the thermoplastic polymer, and a plurality of intumescent particles to form a suspension of intumescent particles in a miscible thermoplastic polymer-solvent solution;
  inducing phase separation of the thermoplastic polymer from the solvent; and
  removing at least a portion of the solvent to provide the polymer matrix composite.

"Miscible" as used herein refers to the ability of substances to mix in all proportions (i.e., to fully dissolve in each other at any concentration), forming a solution, wherein for some solvent-polymer systems heat may be needed for the polymer to be miscible with the solvent. By contrast, substances are immiscible if a significant proportion does not form a solution. For example, butanone is significantly soluble in water, but these two solvents are not miscible because they are not soluble in all proportions.

"Phase separation," as used herein, refers to the process in which particles are uniformly dispersed in a homogeneous polymer-solvent solution that is transformed (e.g., by a change in temperature or solvent concentration) into a continuous three-dimensional polymer matrix composite. In the first method, the desired article is formed before the polymer becomes miscible with the solvent and the phase separation is a thermally induced phase separation (TIPS) process. In the second method, the polymer is miscible with the solvent before the desired article is formed. In the second method, phase separation is achieved via solvent induced phase separation (SIPS) using a wet or dry process, or thermally induced phase separation methods.

In the SIPS wet process, the solvent dissolving the polymer is exchanged with a nonsolvent to induce phase separation. The new exchanging solvent in the system becomes the pore former for the polymer. In the SIPS dry process, the solvent dissolving the polymer is evaporated to induce phase separation. In the dry process, a nonsolvent is also solubilized in the solution by the solvent dissolving the polymer. This nonsolvent for the polymer becomes the pore former for the polymer as the solubilizing solvent evaporates. The process is considered a "dry process" because no additional exchange liquids are used. The nonsolvent is also normally volatile but has a boiling point at least 30° C. lower than the solvent.

In the TIPS process, elevated temperature is used to make a nonsolvent become a solvent for the polymer, then the temperature is lowered returning the solvent to a nonsolvent for the polymer. Effectively, the hot solvent becomes the pore former when sufficient heat is removed and it loses its solvating capacity. The solvent used in the thermal phase separation process can be volatile or nonvolatile.

Surprisingly, in the first method to make a polymer matrix composite, the relatively high particle loadings allow a slurry to be made that can be shaped into a layer, that maintains its form as the solvent is heated to become miscible with the polymer. The solvent used is normally volatile and is later evaporated. In the second method using TIPS process to make a polymer matrix composite, the solvent used is normally nonvolatile. In the second method to make a polymer matrix composite by the wet or dry SIPS process, the solvents are normally nonvolatile for the wet process and volatile for the dry process.

Typically, the maximum particle loading that can be achieved in traditional particle-filled composites (dense polymeric films, adhesives, etc.), is not more than about 40 to 60 vol. %, based on the volume of the particles and binder. Incorporating more than 60 vol. % particles into traditional particle-filled composites typically is not achievable because such high particle loaded materials cannot be processed via coating or extrusion methods and/or the resulting composite becomes very brittle. Traditional composites also typically fully encapsulate the particles with binder, preventing access to the particle surfaces and minimizing potential particle-to-particle contact. Surprisingly, the high levels of solvent and the phase separated morphologies obtained with the methods described herein, enable relatively high particle loadings with relatively low amounts of high molecular weight binder. The through-porous, phase-separated morphologies, also allow samples to be breathable at relatively low to relatively high particle concentrations. The high particle loading also helps minimize the formation of thin non-porous polymer layer that can form during phase separation. Moreover, the polymer matrix composites described herein are relatively flexible, and tend not to shed particles. Although not wanting to be bound by theory, it is believed that another advantage of embodiments of polymer matrix composites described herein, is that the particles are not fully coated with binder enabling a high degree of particle surface contact, without masking due to the porous nature of the binder. It should be noted that compression of the layer can significantly enhance the particle-to-particle contact. The high molecular weight binder also does not readily flow in the absence of solvent, even at elevated temperatures (e.g., 135° C.).

Polymer matrix composites described herein are useful, for example, as fillers, thermally initiated fuses, and fire stop devices. The high expansion volume and high forces generated during the expansion of intumescent layers can also make them useful for physically separating components. As intumescent materials expand they can fill gaps and cracks.

DETAILED DESCRIPTION

The intumescent particles are present in a range from 15 to 99 (in some embodiments, in a range from 25 to 98, 50 to 98, 75 to 98, or even 93 to 97) weight percent, based on the total weight of the intumescent particles and the polymer (excluding any solvent).

Intumescent particles can take the form of at least one of polymeric or inorganic material that is capable of significantly increasing in volume as a result of exposure to heat above their activation temperature. Exemplary intumescent particles comprise at least one of sodium silicate, intercalated graphite, aluminum hydroxide, magnesium hydroxide, ammonium polyphosphate, clay, or vermiculite.

The selection of intumescent particles may vary depending, for example, on the desired end use. For example, for temperatures about 500° C., unexpanded vermiculite materials are desirable because they typically start to expand at a temperature in a range from about 300 to about 340° C. to fill, for example, the expanding gap between an expanding metal housing and a monolith in a catalytic converter. For use temperature below about 500° C. (e.g., in diesel monoliths or particulate filters), expandable graphite or a mixture of expandable graphite and unexpanded vermiculite materials may be desired since expandable graphite typically starts to expand or intumesce at about 210° C. Treated vermiculites are also useful and typically expand at a temperature of about 290° C.

Useful intumescent materials also include unexpanded vermiculite ore, treated unexpanded vermiculite ore, partially dehydrated vermiculite ore, expandable graphite (e.g., expandable graphite flakes available, for example, under the trade designation "GRAFOIL GRADE 338-50" from UCAR Carbon Co., Inc., Cleveland, OH), mixtures of expandable graphite with treated and/or untreated unexpanded vermiculite ore, processed expandable sodium silicate (e.g., an insoluble sodium silicate available, for example, under the trade designation "EXPANTROL" from 3M Company, St. Paul, MN), and mixtures thereof.

Treated unexpanded vermiculite flakes or ore include unexpanded vermiculite treated by processes such as by being ion exchanged with ion exchange salts (e.g., ammonium dihydrogen phosphate, ammonium nitrate, ammonium chloride, potassium chloride, and other suitable compounds as is known in the art).

The amount and type of intumescent material incorporated into the polymer matrix composite may contribute significantly to the cost of the product. Untreated intumescent materials, such as unexpanded vermiculite, are generally less expensive than treated intumescent materials, but may provide different intumescing temperatures and amounts and rates of expansion.

In some embodiments, the intumescent particles have a layered structure that allows for easy exfoliation. Within the individual layers of the particle, fluids (e.g., sulfuric acid) may be introduced and held tightly to the surface of the layer (intercalated). When such material is exposed to heat the fluid held within the layers expands. The expansion of the fluid pushes against the individual layer, separating them apart further (exfoliation). An observed result of this behavior is the bulk film expanding in volume. The degree of expansion, and the temperature at which expansion takes place, is dependent, for example, on the type of fluid intercalated into the layers.

In some embodiments, the intumescent material is particulate that is primarily a solid phase that transitions to include both a solid and a gas phase. For example, an intumescent particle can contain surface adsorbed species that volatilize when heated. Examples of such particles include those associated with water (e.g., calcium sulfate dehydrate). When this type of material is heated, some of the water molecules associated with the surface of the particle change from an adsorbed species to a vapor phase. The release of the adsorbed species results in a volume change of the of the polymer matrix composites comprising the particles. The generated vapor pushes against the surrounding matrix, causing the structure to increase in volume.

In some embodiments, the intumescent particles comprise first and second, different (i.e., different activation temperatures, composition, and/or microstructure) intumescent particles. In some embodiments, the first intumescent particles comprise at least one of sodium silicate, intercalated graphite, aluminum hydroxide, magnesium hydroxide, ammonium polyphosphate, clay, or vermiculite. In some embodiments, the second intumescent particles comprise at least one of sodium silicate, intercalated graphite, aluminum hydroxide, magnesium hydroxide, ammonium polyphosphate, clay, or vermiculite. Combining two different intumescent particle types may provide a broader thermal activation range and enable more expansion, with lower onset temperatures.

In some embodiments, the first intumescent particles have an average particle size (average length of longest dimension) in a range from 500 nm to 7000 micrometers (in some embodiments, in a range from 70 micrometers to 300 micrometers, 300 micrometers to 800 micrometers, 800 micrometers to 1500 micrometers, or even 1500 micrometers to 7000 micrometers). In some embodiments, the second intumescent particles have an average particle size (average length of longest dimension) in a range from 500 nm to 1500 micrometers (in some embodiments, in a range from 70 micrometers to 300 micrometers, 300 micrometers to 800 micrometers, or even 1500 micrometers to 7000 micrometers).

In some embodiments, the first intumescent particles are present in a range from 15 to 99 (in some embodiments, in a range from 25 to 98, 50 to 98, 75 to 98, or even 93 to 97) weight percent, and the second intumescent particles are present in a range from 15 to 99 (in some embodiments, in a range from 25 to 98, 50 to 98, 75 to 98, or even 93 to 97) weight percent, based on the total weight of the first and second intumescent particles.

Exemplary sizes of the intumescent particles range from 100s of nanometers to 1000s of micrometers in size. Exemplary shapes of the intumescent particles include irregular, and platy, shapes, and as well as agglomerated forms. Agglomerates can range in size, for example, from a few micrometers up to and including several millimeters. The particles can be mixed to have multimodal size distributions which may, for example, allow for optimal packing density.

As-made polymer matrix composites described herein (i.e., prior to any compression or other post formation densification), typically have a density of at least 0.3 (in some embodiments, in a range from 0.3 to 2.3, 0.3 to 2.1, 0.3 to 1.5, or even 0.3 to 1 $g/cm^3$.

In some embodiments, compressed polymer matrix composites have a density of at least 0.3 (in some embodiments, in a range from 0.3 to 2.3, 0.3 to 2.1, 0.3 to 1.5, or even 0.3 to 1 $g/cm^3$.

In some embodiments, polymer matrix composites described herein have a porosity of at least 5 (in some embodiments, in a range from 10 to 80, 20 to 70, or even 30 to 60) percent.

The polymeric network structure may be described as a porous polymeric network or a porous phase separated polymeric network. Generally, the porous polymeric network (as-made) includes an interconnected porous polymeric network structure comprising a plurality of interconnected morphologies (e.g., at least one of fibrils, nodules, nodes, open cells, closed cells, leafy laces, strands, nodes, spheres, or honeycombs). The interconnected polymeric structures may adhere directly to the surface of the particles and act as a binder for the particles. In this regard, the space between adjacent particles (e.g., particles or agglomerate particles) may include porous polymeric network structures, as opposed to a solid matrix material, thereby providing desired porosity.

In some embodiments, the polymeric network structure may include a 3-dimensional reticular structure that includes an interconnected network of polymeric fibrils. In some embodiments, individual fibrils have an average width in a range from 10 nm to 100 nm (in some embodiments, in a range from 100 nm to 500 nm, or even 500 nm to 5 micrometers).

In some embodiments, the particles are dispersed within the polymeric network structure, such that an external surface of the individual units of the particles (e.g., individual particles or individual agglomerate particles) is mostly uncontacted, or uncoated, by the polymeric network structure. In this regard, in some embodiments, the average percent areal coverage of the polymeric network structure on the external surface of the individual particles (i.e., the percent of the external surface area that is in direct contact with the polymeric network structure) is not greater than 50 (in some embodiments, not greater than 40, 30, 25, 20, 10, 5, or even not greater than 1) percent, based on the total surface area of the external surfaces of the individual particles.

In some embodiments, the polymeric network structure does not penetrate internal porosity or internal surface area of the individual particles (e.g., individual particles or individual agglomerate particles are mostly uncontacted, or uncoated, by the polymeric network structure).

In some embodiments, the polymeric network structure may comprise, consist essentially of, or consist of at least one thermoplastic polymer. Exemplary thermoplastic polymers include polyurethane, polyester (e.g., polyethylene terephthalate, polybutylene terephthalate, and polylactic acid), polyamide (e.g., nylon 6, nylon 6,6, nylon 12 and polypeptide), polyether (e.g., polyethylene oxide and polypropylene oxide), polycarbonate (e.g., bisphenol-A-polycarbonate), polyimide, polysulphone, polyethersulphone, polyphenylene oxide, polyacrylate (e.g., thermoplastic polymers formed from the addition polymerization of monomer(s) containing an acrylate functional group), polymethacrylate (e.g., thermoplastic polymers formed from the addition polymerization of monomer(s) containing a methacrylate functional group), polyolefin (e.g., polyethylene and polypropylene), styrene and styrene-based random and block copolymer, chlorinated polymer (e.g., polyvinyl chloride), fluorinated polymer (e.g., polyvinylidene fluoride; copolymers of tetrafluoroethylene, hexafluoropropylene and vinylidene fluoride; copolymers of ethylene, tetrafluoroethylene; hexafluoropropylene; and polytetrafluoroethylene), and copolymers of ethylene and chlorotrifluoroethylene. In some embodiments, thermoplastic polymers include homopolymers or copolymers (e.g., block copolymers or random copolymers). In some embodiments, thermoplastic polymers include a mixture of at least two thermoplastic polymer types (e.g., a mixture of polyethylene and polypropylene or a mixture of polyethylene and polyacrylate). In some embodiments, the polymer may be at least one of polyethylene (e.g., ultra-high molecular weight polyethylene), polypropylene (e.g., ultra-high molecular weight polypropylene), polylactic acid, poly(ethylene-co-chlorotrifluoroethylene) and polyvinylidene fluoride. In some embodiments, the thermoplastic polymer is a single thermoplastic polymer (i.e., it is not a mixture of at least two thermoplastic polymer types). In some embodiments, the thermoplastic polymers consist essentially of, or consist of polyethylene (e.g., ultra-high molecular weight polyethylene).

In some embodiments, the thermoplastic polymer used to make the polymer matrix composites described herein are particles having a particle size less than 1000 (in some embodiments, in a range from 1 to 10, 10 to 30, 30 to 100, 100 to 200, 200 to 500, 500 to 1000) micrometers.

In some embodiments, the porous polymeric network structure comprises at least one of polyacrylonitrile, polyurethane, polyester, polyamide, polyether, polycarbonate, polyimide, polysulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

In some embodiments, the porous polymeric network structure comprises a polymer having a number average molecular weight in a range from $5 \times 10^4$ to $1 \times 10^7$ (in some embodiments, in a range from $1 \times 10^6$ to $8 \times 10^6$, $2 \times 10^6$ to $6 \times 10^6$, or even $3 \times 10^6$ to $5 \times 10^6$) g/mol. For purposes of the present disclosure, the number average molecular weight can be measured by known techniques in the art (e.g., gel permeation chromatography (GPC)). GPC may be conducted in a suitable solvent for the thermoplastic polymer, along with the use of narrow molecular weight distribution polymer standards (e.g., narrow molecular weight distribution polystyrene standards). Thermoplastic polymers are generally characterized as being partially crystalline, exhibiting a melting point. In some embodiments, the thermoplastic polymer may have a melting point in a range from 120 to 350 (in some embodiments, in a range from 120 to 300, 120 to 250, or even 120 to 200) ° C. The melting point of the thermoplastic polymer can be measured by known techniques in the art (e.g., the on-set temperature measured in a differential scanning calorimetry (DSC) test, conducted with a 5 to 10 mg sample, at a heating scan rate of 10° C./min., while the sample is under a nitrogen atmosphere).

In some embodiments, the polymeric network structure is a continuous network structure (i.e., the polymer phase comprises a structure that is open cell with continuous voids or pores forming interconnections between the voids, extending throughout the structure). In some embodiments, at least 2 (in some embodiments, at least 5, 10, 20, 30, 40, 50, 60, 70, 80, 90, 95, or even, 100) percent of the polymer network structure, by volume, may be a continuous polymer network structure. It should be noted that for purposes of the present disclosure, the portion of the volume of the polymer matrix composite made up of the particles is not considered part of the polymeric network structure. In some embodiments, the polymer network extends between two particles forming a network of interconnected particles.

The solvent (e.g., a first solvent) is selected such that it forms a miscible polymer-solvent solution. In some cases, elevated temperatures may be required to form the miscible polymer-solvent solution. The solvent may be a blend of at least two individual solvents. In some embodiments, when the polymer is a polyolefin (e.g., at least one of polyethylene and polypropylene), the solvent may be, for example, at least one of mineral oil, tetralin, decalin, orthodichlorobenzene, cyclohexane-toluene mixture, dodecane, paraffin oil/wax, kerosene, isoparaffinic fluids, p-xylene/cyclohexane mixture (1/1 wt./wt.), camphene, 1,2,4 trichlorobenzene, octane, orange oil, vegetable oil, castor oil, or palm kernel oil. In some embodiments, when the polymer is polyvinylidene fluoride, the solvent may be, for example, at least one of ethylene carbonate, propylene carbonate, or 1,2,3 triacetoxypropane. The solvent may be removed, for example, by evaporation. High vapor pressure solvents being particularly suited to this method of removal. If, however, the first solvent has a low vapor pressure, it may be desirable to have a second solvent, of higher vapor pressure, to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethylnonafluorobutyl ether ($C_4F_9OC_2H_5$), and trans-1,2-dichloroethylene (available, for example, under the trade designation "NOVEC 72DE" from 3M Company, St. Paul, MN) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.), may be used as the second solvent. In some embodiments, when ethylene carbonate is used as the first solvent, water may be used as the second solvent.

In some embodiments, small quantities of other additives can be added to the polymer matrix composite to impart additional functionality or act as processing aids. These include viscosity modifiers (e.g., fumed silica, block copolymers, and wax), plasticizers, thermal stabilizers (e.g., such as available, for example, under the trade designation "IRGANOX 1010" from BASF, Ludwigshafen, Germany), antimicrobials (e.g., silver and quaternary ammonium), flame retardants, antioxidants, dyes, pigments, and ultraviolet (UV) stabilizers.

In some embodiments, polymer matrix composites described herein, are in the form of a layer having a thickness in a range from 50 to 11000 micrometers, wherein the thickness excludes the height of any protrusions extending from the base of the layer.

In some embodiments, the porous polymeric network structure is produced by an induced phase separation of a miscible thermoplastic polymer-solvent solution. In some embodiments, induced phase separation is at least one of thermally induced phase separation or solvent induced phase separation.

First Method

A first method of making polymer matrix composites described herein comprises:
  combining (e.g., mixing or blending) a thermoplastic polymer, a solvent, and a plurality of intumescent particles to provide a slurry;
  forming the slurry in to an article (e.g., a layer);

heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent of the thermoplastic polymer, based on the total weight of the thermoplastic polymer; and inducing phase separation of the thermoplastic polymer from the solvent to provide the polymer matrix composite.

If the particles are dense, typically the slurry is continuously mixed or blended to prevent or reduce settling or separation of the polymer and/or particles from the solvent. In some embodiments, the slurry is degassed using techniques known in the art to remove entrapped air.

The slurry can be formed in to an article using techniques known in the art, including knife coating, roll coating (e.g., roll coating through a defined nip), and coating through any number of different dies having the appropriate dimensions or profiles.

In some embodiments of the first method, combining is conducted at at least one temperature below the melting point of the polymer and below the boiling point of the solvent.

In some embodiments of the first method, heating is conducted at at least one temperature above the melting point of the miscible thermoplastic polymer-solvent solution, and below the boiling point of the solvent.

In some embodiments of the first method, inducing phase separation is conducted at a temperature less than the melting point of the polymer in the slurry. Although not wanting to be bound, it is believed that in some embodiments, solvents used to make a miscible blend with the polymer can cause melting point depression in the polymer. The melting point described herein includes below any melting point depression of the polymer solvent system.

In some embodiments of the first method, the solvent is a blend of at least two individual solvents. In some embodiments, when the polymer is a polyolefin (e.g., at least one of polyethylene or polypropylene), the solvent may be at least one of mineral oil, tetralin, decalin, 1,2-orthodichlorobenzene, cyclohexane-toluene mixture, dodecane, paraffin oil/wax, kerosene, p-xylene/cyclohexane mixture (1/1 wt./wt.), camphene, 1,2,4 trichlorobenzene, octane, orange oil, vegetable oil, castor oil, or palm kernel oil. In some embodiments, when the polymer is polyvinylidene fluoride, the solvent is at least one of ethylene carbonate, propylene carbonate, or 1,2,3 triacetoxypropane.

In some embodiments of the first method, the polymeric network structure may be formed during phase separation. In some embodiments, the polymeric network structure is provided by an induced phase separation of a miscible thermoplastic polymer-solvent solution. In some embodiments, the phase separation is induced thermally (e.g., via thermally induced phase separation (TIPS) by quenching to a lower temperature than used during heating). Cooling can be provided, for example, in air, liquid, or on a solid interface, and varied to control the phase separation. The polymeric network structure may be inherently porous (i.e., have pores). The pore structure may be open, enabling fluid communication from an interior region of the polymeric network structure to an exterior surface of the polymeric network structure and/or between a first surface of the polymeric network structure and an opposing second surface of the polymeric network structure.

In some embodiments of the method described herein, the weight ratio of solvent to polymer is at least 9:1. In some embodiments, the volume ratio of particles to polymer is at least 9:1. In some embodiments, and for ease of manufacturing, it may be desirable to form a layer at room temperature. Typically, during the layer formation using phase separation, relatively small pores are particularly vulnerable to collapsing during solvent extraction. The relatively high particle to polymer loading achievable by the methods described herein may reduce pore collapsing and yield a more uniform defect-free polymer matrix composite.

In some embodiments, the first method further comprises removing at least a portion (in some embodiments, at least 5, 10, 15, 20, 25, 30, 35, 40, 45, 50, 55, 60, 65, 70, 75, 80, 85, 90, 95, 96, 97, 98, 99, 99.5, or even 100 percent by weight of the solvent, based on the weight of the solvent in the formed article) of the solvent from the formed article, after inducing phase separation of the thermoplastic polymer from the solvent.

In some embodiments of the first method, at least 90 percent by weight of the solvent, based on the weight of the solvent in the formed article, is removed, wherein the formed article, before removing at least 90 percent by weight of the solvent, based on the weight of the solvent in the formed article, of the solvent has a first volume, wherein the formed article, after removing at least 90 percent by weight of the solvent, based on the weight of the solvent in the formed article, has a second volume, and wherein the difference between the first and second volume (i.e., (the first volume minus the second volume) divided by the first volume times 100) is less than 10 (in some embodiments, less than 9, 8, 7, 6, 5, 4, 3, 2, 1, 0.75, 0.5, or even less than 0.3) percent. Volatile solvents can be removed from the polymer matrix composite, for example, by allowing the solvent to evaporate from at least one major surface of the polymer matrix composite. Evaporation can be aided, for example, by the addition of at least one of heat, vacuum, or air flow. Evaporation of flammable solvents can be achieved in a solvent-rated oven. If the first solvent, however, has a low vapor pressure, a second solvent, of higher vapor pressure, may be used to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethyl-nonafluorobutyl ether ($C_4F_9OC_2H_5$), and trans-1,2-dichloroethylene (available under the trade designation "NOVEC 72DE" from 3M Company, St. Paul, MN) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.) may be used as the second solvent. In some embodiments, when ethylene carbonate is used as the first solvent, water may be used as the second solvent.

In some embodiments of the first method, the article has first and second major surfaces with ends perpendicular to the first and second major surfaces, and the ends are unrestrained (i.e., without the need for restraints during extraction) during the solvent removal. This can be done, for example, by drying a portion of a layer without restraint in an oven. Continuous drying can be achieved, for example, by drying a long portion of a layer supported on a belt as it is conveyed through an oven. Alternatively, to facilitate removal of non-volatile solvents, for example, a long portion of a layer can be continuously conveyed through a bath of compatible volatile solvent thereby exchanging the solvents and allowing the layer to be subsequently dried without restraint. Not all the non-volatile solvent, however, need be removed from the layer during the solvent exchange. Small amounts of non-volatile solvents may remain and act as a plasticizer to the polymer.

In some embodiments of the first method, the formed, phase separated article after the solvent removal, has a porosity of at least 5 (in some embodiments, at least 10, 20, 30, 35, 40, 45, 50, 55, 60, 65, 70, 75, 80, 85, or even at least 90; in some embodiments, in a range from 25 to 90) percent. This porosity is caused by the phase separation of the polymer from the solvent, which initially leaves no unfilled voids, as the pores in the polymer matrix composite are filled with solvent. After the solvent is completely or partly removed, void spaces in the polymer matrix composite are exposed. The particle-to-particle interactions can minimize the collapse or deformation of the porous polymer matrix composite from capillary-induced negative pressures from the solvent drying process.

In some embodiments of the first method, no solvent is removed from the formed article (even after inducing phase separation of the thermoplastic polymer from the solvent). This can be accomplished, for example, by using a non-volatile solvent (e.g., mineral oil or wax) and not completing the extraction/evaporation step.

Second Method

A second method of making polymer matrix composites described herein comprises:

combining (e.g., mixing or blending) a thermoplastic polymer, a solvent for the thermoplastic polymer, and a plurality of intumescent particles to form a suspension of intumescent particles in a miscible thermoplastic polymer-solvent solution;

inducing phase separation of the thermoplastic polymer from the solvent; and removing at least a portion of the solvent to provide the polymer matrix composite.

In some embodiments, the second method further comprises adding the intumescent particles to the miscible polymer-solvent solution, prior to phase separation. The polymeric network structure may be formed during the phase separation of the process. In some embodiments, the polymeric network structure is provided via an induced phase separation of a miscible thermoplastic polymer-solvent solution. In some embodiments, the phase separation is induced thermally (e.g., via thermally induced phase separation (TIPS) by quenching to lower temperature), chemically (e.g., via solvent induced phase separation (SIPS) by substituting a poor solvent for a good solvent), or change in the solvent ratio (e.g., by evaporation of one of the solvents). Other phase separation or pore formation techniques known in the art, such as discontinuous polymer blends (also sometimes referred to as polymer assisted phase inversion (PAPI)), moisture induced phase separation, or vapor induced phase separation, can also be used. The polymeric network structure may be inherently porous (i.e., have pores). The pore structure may be open, enabling fluid communication from an interior region of the polymeric network structure to an exterior surface of the polymeric network structure and/or between a first surface of the polymeric network structure and an opposing second surface of the polymeric network structure.

In some embodiments of the second method, the polymer in the miscible thermoplastic polymer-solvent solution has a melting point, wherein the solvent has a boiling point, and wherein combining is conducted at at least one temperature above the melting point of the miscible thermoplastic polymer-solvent solution, and below the boiling point of the solvent.

In some embodiments of the second method, the polymer in the miscible thermoplastic polymer-solvent solution has a melting point, and wherein inducing phase separation is conducted at at least one temperature less than the melting point of the polymer in the miscible thermoplastic polymer-solvent solution. The thermoplastic polymer-solvent mixture may be heated to facilitate the dissolution of the thermoplastic polymer in the solvent. After the thermoplastic polymer has been phase separated from the solvent, at least a portion of the solvent may be removed from the polymer matrix composite using techniques known in the art, including evaporation of the solvent or extraction of the solvent by a higher vapor pressure, second solvent, followed by evaporation of the second solvent. In some embodiments, in a range from 10 to 100 (in some embodiments, in a range from 20 to 100, 30 to 100, 40 to 100, 50 to 100, 60 to 100, 70 to 100, 80 to 100, 90 to 100, 95 to 100, or even 98 to 100) percent by weight of the solvent, and second solvent, if used, may be removed from the polymer matrix composite.

The solvent is typically selected such that it is capable of dissolving the polymer and forming a miscible polymer-solvent solution. Heating the solution to an elevated temperature may facilitate the dissolution of the polymer. In some embodiments, combining the polymer and solvent is conducted at at least one temperature in a range from 20° C. to 350° C. The intumescent particles may be added at any or all of the combining, before the polymer is dissolved, after the polymer is dissolved, or at any time there between.

In some embodiments, the solvent is a blend of at least two individual solvents. In some embodiments, when the polymer is a polyolefin (e.g., at least one of polyethylene or polypropylene), the solvent may be at least one of mineral oil, paraffin oil/wax, camphene, orange oil, vegetable oil, castor oil, or palm kernel oil. In some embodiments, when the polymer is polyvinylidene fluoride, the solvent is at least one of ethylene carbonate, propylene carbonate, or 1,2,3 triacetoxypropane.

In some embodiments, the solvent may be removed, for example, by evaporation, high vapor pressure solvents being particularly suited to this method of removal. If the first solvent, however, has a low vapor pressure, a second solvent, of higher vapor pressure, may be used to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethylnonafluorobutyl ether ($C_4F_9OC_2H_5$), and trans-1,2-dichloroethylene (available under the trade designation "NOVEC 72DE" from 3M Company, St. Paul, MN) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.) may be used as the second solvent. In some embodiments, when ethylene carbonate is used as the first solvent, water may be used as the second solvent.

Typically, in the phase separation process, the blended mixture is formed in to a layer prior to solidification of the polymer. The polymer is dissolved in solvent (that allows formation of miscible thermoplastic-solvent solution), and the intumescent particles dispersed to form a blended mixture, that is formed into an article (e.g., a layer), followed by phase separation (e.g., temperature reduction for TIPS, solvent evaporation or solvent exchange with nonsolvent for SIPS). The layer-forming may be conducted using techniques known in the art, including, knife coating, roll coating (e.g., roll coating through a defined nip), and extrusion (e.g., extrusion through a die (e.g., extrusion through a die having the appropriate layer dimensions (i.e., width and thickness of the die gap))). In one exemplary embodiment, the mixture has a paste-like consistency and is formed in to a layer by extrusion (e.g., extrusion through a die having the appropriate layer dimensions (i.e., width and thickness of the die gap)).

After forming the slurry into a layer, where the thermoplastic polymer is miscible in its solvent, the polymer is then induced to phase separate. Several techniques may be used to induce phase separation, including at least one of thermally induced phase separation or solvent induced phase separation. Thermally induced phase separation may occur when the temperature at which induced phase separation is conducted is lower than the combining temperature of the polymer, solvent, and intumescent particles. This may be achieved by cooling the miscible polymer-solvent solution, if combining is conducted near room temperature, or by first heating the miscible polymer-solvent solution to an elevated temperature (either during combining or after combining), followed by decreasing the temperature of the miscible polymer-solvent solution, thereby inducing phase separation of the thermoplastic polymer. In both cases, the cooling may cause phase separation of the polymer from the solvent. Solvent induced phase separation can be conducted by adding a second solvent, a poor solvent for the polymer, to the miscible polymer-solvent solution or may be achieved by removing at least a portion of the solvent of the miscible polymer-solvent solution (e.g., evaporating at least a portion of the solvent of the miscible polymer-solvent solution), thereby inducing phase separation of the polymer. Combination of phase separation techniques (e.g., thermally induced phase separation and solvent induced phase separation), may be employed. Thermally induced phase separation, may be advantageous, as it also facilitates the dissolution of the polymer when combining is conducted at an elevated temperature. In some embodiments, thermally inducing phase separation is conducted at at least one temperature in a range from 5 to 300 (in some embodiments, in a range from 5 to 250, 5 to 200, 5 to 150, 15 to 300, 15 to 250, 15 to 200, 15 to 130, or even 25 to 110) ° C. below the combining temperature.

After inducing phase separation, at least a portion of the solvent may be removed, thereby forming a porous polymer matrix composite layer having a polymeric network structure and an intumescent material distributed within the thermoplastic polymer network structure.

The solvent may be removed by evaporation, high vapor pressure solvents being particularly suited to this method of removal. If the first solvent, however, has a low vapor pressure, a second solvent, of higher vapor pressure, may be used to extract the first solvent, followed by evaporation of the second solvent. In some embodiments, in a range from 10 to 100 (in some embodiments, in a range from 20 to 100, 30 to 100, 40 to 100, 50 to 100, 60 to 100, 70 to 100, 80 to 100, 90 to 100, 95 to 100, or even 98 to 100) percent by weight of the solvent, and second solvent, if used, may be removed from the polymer matrix composite.

In some embodiments, the first and second methods further comprise compressing the polymer matrix composite. That is, after inducing phase separation, the formed polymeric network structure may be compressed, for example, to tune the air flow resistance of the polymer matrix composite. Compression of the polymer matrix composite may be achieved, for example, by conventional calendaring processes known in the art.

In some embodiments, where the network structure is plastically deformed by at least a compressive force, vibratory energy may be imparted during the application of the compressive force. In some of these embodiments, the polymer composite is in the form of a strip of indefinite length, and the applying of a compressive force step is performed as the strip passes through a nip. A tensile loading may be applied during passage through such a nip. For example, the nip may be formed between two rollers, at least one of which applies the vibratory energy; between a roller and a bar, at least one of which applies the vibratory energy; or between two bars, at least one of which applies the vibratory energy. The applying of the compressive force and the vibratory energy may be accomplished in a continuous roll-to-roll fashion, or in a step-and-repeat fashion. In other embodiments, the applying a compressive force step is performed on a discrete layer between, for example, a plate and a platen, at least one of which applies the vibratory energy. In some embodiments, the vibratory energy is in the ultrasonic range (e.g., 20 kHz), but other ranges are considered to be suitable. For further details regarding plastically deforming the network structure, see co-pending application having U.S. Ser. No. 62/578,732, filed Oct. 30, 2017, the disclosure of which is incorporated by reference.

In some embodiments, the density of the compressed polymer matrix composite is at least 1 (in some embodiments, at least 2.5, or even at least 1.75; in some embodiments, in the range from 1 to 1.75, or even 1 to 2.5) g/cm$^3$ after compression.

In some embodiments, compressing the polymeric matrix composite increases its density by increasing the particle-to-particle contact. This increase in density can increase the amount of intumescent per unit volume.

In some embodiments, polymer matrix composite described herein can be wrapped around a 0.5 mm (in some embodiments, 0.6 mm, 0.7 mm, 0.8 mm, 0.9 mm, 1 mm, 2 mm, 3 mm, 4 mm, 5 mm, 1 cm, 5 cm, 10 cm, 25 cm, 50 cm, or even 1 meter) rod without breaking.

Figure 1:
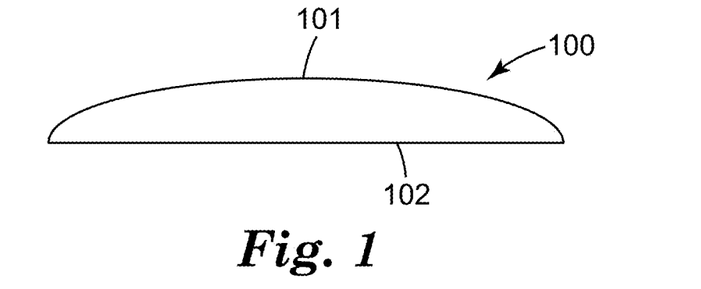
FIG. 1 is a schematic of an exemplary polymer matrix composite described herein.

In some embodiments of both the first and second methods, polymeric matrix composites described herein, have first and second planar, opposed major surfaces. In some embodiments, polymer matrix composites described herein, have first and second opposed major surfaces, wherein the first major surface is nonplanar (e.g., curved). Referring to FIG. 1, exemplary polymer matrix composite described herein 100 has first and second opposed major surfaces 101, 102. First major surface 101 is nonplanar.

Planar and nonplanar major surfaces can be provided, for example, by coating or extruding the slurry onto a patterned substrate (e.g., a liner, a belt, a mold, or a tool). Alternatively, for example, a die with a shaped slot can be used to form nonplanar surfaces during the coating or extrusion process. Alternatively, for example, the structure can be formed after the phase separation has occurred before, and/or after, the solvent is removed by molding or shaping the layer with a patterned tool.

In some embodiments of both the first and second methods, polymer matrix composites described herein, have first protrusions extending outwardly from the first major surface, and in some embodiments, second protrusions extending outwardly from the second major surface. In some embodiments, the first protrusions are integral with the first major surface, and in some embodiments, the second protrusions are integral with the second major surface. Exemplary protrusions include at least one of a post, a rail, a hook, a pyramid, a continuous rail, a continuous multi-directional rail, a hemisphere, a cylinder, or a multi-lobed cylinder. In some embodiments, the protrusions have a cross-section in at least one of a circle, a square, a rectangle, a triangle, a pentagon, other polygons, a sinusoidal, a herringbone, or a multi-lobe.

Figure 2:
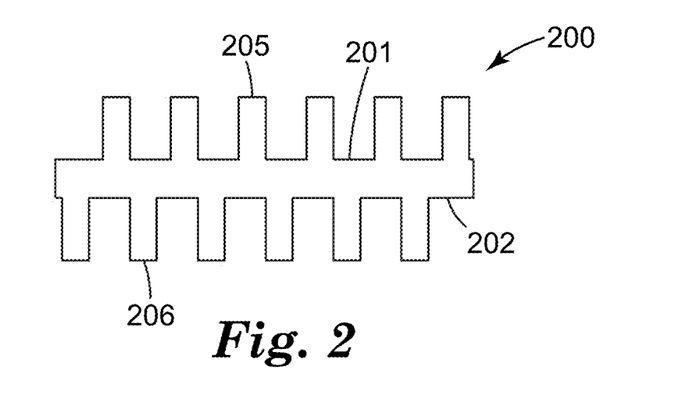
FIG. 2 is a schematic of another exemplary polymer matrix composite described herein.

Referring to FIG. 2, exemplary polymer matrix composite described herein 200 has first protrusions 205 extending outwardly from first major surface 201 and optional second protrusions 206 extending outwardly from second major surface 202.

Protrusions can be provided, for example, by coating or extruding between patterned substrate (e.g., a liner, a belt, a mold, or a tool). Alternatively, a die with a shaped slot can be used to form protrusions during the coating or extrusion process. Alternatively, for example, the structure can be formed after the phase separation has occurred before, and/or after, the solvent is removed by molding or shaping the film between patterned tools.

Figure 3:
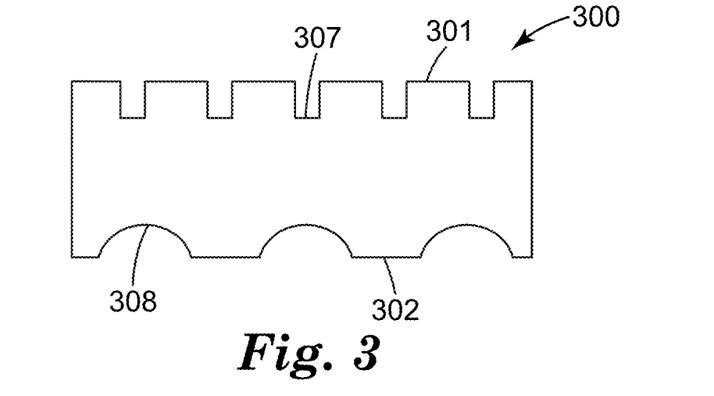
FIG. 3 is a schematic of another exemplary polymer matrix composite described herein.

In some embodiments of both the first and second methods, polymer matrix composite described herein, have first depressions extending into the first major surface, and in some embodiments, second depressions extending into the second major surface. Exemplary depressions include at least one of a groove, a slot, an inverted pyramid, a hole (including a thru or blind hole), or a dimple. Referring to FIG. 3, exemplary polymer matrix composite described herein 300 has first depressions 307 extending into first major surface 301 and optional second depressions 308 extending into second major surface 302.

Depressions can be provided, for example, by coating or extruding between a patterned substrate (e.g., a liner, a belt, a mold, or a tool). Alternatively, for example, a die with a shaped slot can be used to form depressions during the coating or extrusion process. Alternatively, for example, the structure can be formed after the phase separation has occurred, before and/or after, the solvent is removed by molding or shaping the film between patterned tools.

In some embodiments, polymer matrix composites described herein further comprise a reinforcement (e.g., attached to the polymer matrix composite, partial therein, and/or therein). Exemplary reinforcements include fibers, strands, nonwovens, woven materials, fabrics, mesh, and films. The reinforcement, for example, can be laminated to the polymer matrix composite thermally, adhesively, or ultrasonically. The reinforcement, for example, can be imbedded within the polymer matrix composite during the coating or extrusion process. The reinforcement, for example, can be between the major surfaces of the composite, on one major surface, or on both major surfaces. More than one type of reinforcement can be used.

Polymer matrix composites described herein are useful, for example, as fillers, thermally activated fuses, and fire stop devices. For further details of fire stop devices in general, see, for example, U.S. Pat. No. 6,820,382 (Chambers et al.), the disclosure of which is incorporated herein by reference. For further details of fillers in general, see, for example, U.S. Pat. No. 6,458,418 (Langer et al.) and U.S. Pat. No. 8,080,210 (Hornback, III), the disclosures of which are incorporated herein by reference.

EXEMPLARY EMBODIMENTS

1A. A polymer matrix composite comprising:
  a porous polymeric network structure; and
  a plurality of intumescent particles distributed within the polymeric network structure, wherein the intumescent particles are present in a range from 15 to 99 (in some embodiments, in a range from 25 to 98, 50 to 98, 75 to 98, or even 93 to 97) weight percent, based on the total weight of intumescent particles and the polymer (excluding any solvent); and wherein the polymer matrix composite volumetrically expands at least 2 times its initial volume when exposed to at least one temperature greater than at least 150, 175, or even at least 200; in some embodiments, in a range from 135 to 400, or even 200 to 400) ° C.

2A. The polymer matrix composite of Exemplary Embodiment 1A, wherein the polymer matrix composite has a density of at least 0.3 (in some embodiments, in a range from 0.3 to 2.3, 0.3 to 2.1, 0.3 to 1.5, or even 0.3 to 1) g/cm$^3$.

3A. The polymer matrix composite of any preceding A Exemplary Embodiment, wherein the polymer matrix composite has a porosity of at least 5 (in some embodiments, in a range from 10 to 80, 20 to 70, or even 30 to 60) percent.

4A. The polymer matrix composite of any preceding A Exemplary Embodiment, wherein the intumescent particles comprise at least one of sodium silicate, intercalated graphite, aluminum hydroxide, magnesium hydroxide, ammonium polyphosphate, clay, or vermiculite.

5A. The polymer matrix composite of any preceding A Exemplary Embodiment, wherein the intumescent particles have an average particle size 500 nm to 7000 micrometers (in some embodiments, in a range from 70 micrometers to 300 micrometers, 300 micrometers to 800 micrometers, 800 micrometers to 1500 micrometers, or even 1500 micrometers to 7000 micrometers).

6A. The polymer matrix composite of any of Exemplary Embodiments 1A to 3A, wherein the intumescent particles comprise first and second, different (i.e., different activation temperatures, compositions, or microstructures) intumescent particles.

7A. The polymer matrix composite of Exemplary Embodiment 6A, wherein the first intumescent particles comprise at least one of sodium silicate, intercalated graphite, aluminum hydroxide, magnesium hydroxide, ammonium polyphosphate, clay, or vermiculite, and wherein the second intumescent particles comprise at least one of sodium silicate, intercalated graphite, aluminum hydroxide, magnesium hydroxide, ammonium polyphosphate, clay, or vermiculite.

8A. The polymer matrix composite of either Exemplary Embodiment 6A or 7A, wherein the first intumescent particles have an average particle size (average length of longest dimension) in a range from 500 nm to 7000 micrometers (in some embodiments, in a range from 70 micrometers to 300 micrometers, 300 micrometers to 800 micrometers, 800 micrometers to 1500 micrometers, or even 1500 micrometers to 7000 micrometers) and the second intumescent particles have an average particle size (average length of longest dimension) in a range 500 nm to 7000 micrometers (in some embodiments, in a range from 70 micrometers to 300 micrometers, 300 micrometers to 800 micrometers, 800 micrometers to 1500 micrometers, or even 1500 micrometers to 7000 micrometers).

9A. The polymer matrix composite of any of Exemplary Embodiments 6A to 8A, wherein the first intumescent particles are present in a range from 15 to 99 (in some embodiments, in a range from 25 to 98, 50 to 98, 75 to 98, or even 93 to 97) weight percent, and wherein the second intumescent particles are present in a weight fraction in a range from 15 to 99 (in some embodiments, in a range from 25 to 98, 50 to 98, 75 to 98, or even 93 to 97) weight percent, based on the total weight of the first and second intumescent particles.

10A. The polymer matrix composite of any preceding A Exemplary Embodiment, wherein the porous polymeric network structure comprises at least one of polyurethane, polyester, polyamide, polyether, polycarbonate, polyimide, polysulfone, polyethersulfone, polyphenylene oxide, polyacrylate, polymethacrylate, polyacrylonitrile, polyolefin, styrene or styrene-based random and block copolymer, chlorinated polymer, fluorinated polymer, or copolymers of ethylene and chlorotrifluoroethylene.

11A. The polymer matrix composite of any preceding A Exemplary Embodiment, wherein the porous polymeric network structure comprises a phase separated plurality of interconnected morphologies (e.g., at least one of fibrils, nodules, nodes, open cells, closed cells, leafy laces, strands, nodes, spheres, or honeycombs).

12A. The polymer matrix composite of any preceding A Exemplary Embodiment, wherein the porous polymeric network structure comprises a polymer having a number average molecular weight in a range from of $5 \times 10^4$ to $1 \times 10^7$ (in some embodiments, in a range from $1 \times 10^6$ to $8 \times 10^6$, $2 \times 10^6$ to $6 \times 10^6$, or even $3 \times 10^6$ to $5 \times 10^6$) g/mol.

13A. The polymer matrix composite of any preceding A Exemplary Embodiment, wherein the polymer matrix composite is in the form of a layer having a thickness in a range from 50 to 7000 micrometers.

14A. The polymer matrix composite of any preceding A Exemplary Embodiment, wherein the porous polymeric network structure is produced by an induced phase separation of a miscible thermoplastic polymer-solvent solution.

15A. The polymer matrix composite of Exemplary Embodiment 14A, wherein induced phase separation is at least one of thermally induced phase separation and solvent induced phase separation.

16A. The polymer matrix composite of any preceding A Exemplary Embodiment, having first and second planar, opposed major surfaces.

17A. The polymer matrix composite of any preceding A Exemplary Embodiment, having first and second opposed major surfaces, wherein the first major surface is nonplanar (e.g., curved or protrusions with no planar surface there between).

18A. The polymer matrix composite of either Exemplary Embodiment 16A or 17A, wherein the first major surface has first protrusions extending outwardly from the first major surface. In some embodiments, the protrusions are integral with the first major surface.

19A. The polymer matrix composite of Exemplary Embodiment 18A, wherein the first protrusions are at least one of a post, a rail, a hook, a pyramid, a continuous rail, a continuous multi-directional rail, a hemisphere, a cylinder, or a multi-lobed cylinder.

20A. The polymer matrix composite of any of Exemplary Embodiments 16A to 19A, wherein the first major surface has first depressions extending into the first major surface.

21A. The polymer matrix composite of Exemplary Embodiment 20A, wherein the first depressions are at least one of a groove, a slot, an inverted pyramid, a hole (including a thru or blind hole), or a dimple.

22A. The polymer matrix composite of any of Exemplary Embodiments 18A to 21A, wherein the second major surface has second protrusions extending outwardly from the second major surface.

23A. The polymer matrix composite of Exemplary Embodiment 22A, wherein the second protrusions are at least one of a post, a rail, a hook, a pyramid, a continuous rail, a continuous multi-directional rail, a hemisphere, a cylinder, or a multi-lobed cylinder.

24A. The polymer matrix composite of any of Exemplary Embodiments 18A to 23A, wherein the second major surface has second depressions extending into the second major surface.

25A. The polymer matrix composite of Exemplary Embodiment 24A, wherein the second depressions are at least one of a groove, a slot, an inverted pyramid, a hole (including a thru or blind hole), or a dimple.

26A. The polymer matrix composite of any preceding A Exemplary Embodiment, further comprising a reinforcement (e.g., attached to the polymer matrix composite, partial therein, and/or therein).

27A. The polymer matrix composite of any preceding A Exemplary Embodiment, that can be wrapped around a 0.5 mm (in some embodiments, 0.6 mm, 0.7 mm, 0.8 mm, 0.9 mm, 1 mm, 2 mm, 3 mm, 4 mm, 5 mm, 1 cm, 5 cm, 10 cm, 25 cm, 50 cm, or even 1 meter) rod without breaking.

28A. The polymer matrix composite of any preceding A Exemplary Embodiment, comprising at least one of a viscosity modifier (e.g., fumed silica, block copolymers, and wax), a plasticizer, a thermal stabilizer (e.g., such as available, for example, under the trade designation "IRGANOX 1010" from BASF, Ludwigshafen, Germany), an antimicrobial (e.g., silver and quaternary ammonium), a flame retardant, an antioxidant, a dye, a pigment, or an ultraviolet (UV) stabilizer.

1B. A method of making the polymer matrix composite of any preceding A Exemplary Embodiment, the method comprising:
 combining (e.g., mixing or blending) a thermoplastic polymer, a solvent, and a plurality of intumescent particles to provide a slurry;
 forming the slurry in to an article (e.g., a layer);
 heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent of the thermoplastic polymer, based on the total weight of the thermoplastic polymer; and
 inducing phase separation of the thermoplastic polymer from the solvent to provide the polymer matrix composite.

2B. The method of Exemplary Embodiment 1B, further comprising removing at least a portion (in some embodiments, at least 5, 10, 15, 20, 25, 30, 35, 40, 45, 50, 55, 60, 65, 70, 75, 80, 85, 90, 95, 96, 97, 98, 99, 99.5, or even 100 percent by weight of the solvent, based on the weight of the solvent in the formed article) of the solvent from the formed article after inducing phase separation of the thermoplastic polymer from the solvent.

3B. The method of Exemplary Embodiment 2B, wherein at least 90 percent by weight of the solvent, based on the weight of the solvent in the formed article, is removed, wherein the formed article, before removing at least 90 percent by weight of the solvent, based on the weight of the solvent in the formed article, of the solvent has a first volume, wherein the formed article, after removing at least 90 percent by weight of the solvent, based on the weight of the solvent in the formed article, has a second volume, and wherein the difference between the first and second volume (i.e., (the first volume minus the second volume) divided by the first volume times 100) is less than 10 (in some embodiments, less than 9, 8, 7, 6, 5, 4, 3, 2, 1, 0.75, 0.5, or even less than 0.3) percent.

4B. The method of Exemplary Embodiment 3B, wherein the article has first and second major surfaces with ends perpendicular to the first and second major surfaces, and where the ends are unrestrained during the solvent removal.

5B. The method of either Exemplary Embodiment 3B or 4B, wherein the formed article after the solvent removal, has a porosity at least 5 (in some embodiments, at least 10, 20, 30, 35, 40, 45, 50, 55, 60, 65, 70, 75, 80, 85, or even at least 90; in some embodiments, in a range from 25 to 90) percent.

6B. The method of Exemplary Embodiment 1B, wherein no solvent is removed from the formed article (even after inducing phase separation of the thermoplastic polymer from the solvent).

7B. The method of any preceding B Exemplary Embodiment, wherein inducing phase separation includes thermally induced phase separation.

8B. The method of any preceding B Exemplary Embodiment, wherein the polymer in the slurry has a melting point, wherein the solvent has a boiling point, and wherein combining is conducted below the melting point of the polymer in the slurry, and below the boiling point of the solvent.

9B. The method of any preceding B Exemplary Embodiment, wherein the polymer in the slurry has a melting point, and wherein inducing phase separation is conducted at less than the melting point of the polymer in the slurry.

10B. The method of any preceding B Exemplary Embodiment, further comprising compressing the polymer matrix composite.

11B. The method of any of Exemplary Embodiments 1B to 9B, further comprising applying vibratory energy to the polymer matrix composite simultaneously with the applying a compressive force.

12B. The method of any preceding B Exemplary Embodiment, wherein the porous polymeric network structure comprises at least one of polyacrylonitrile, polyurethane, polyester, polyamide, polyether, polycarbonate, polyimide, polysulfone, polyethersulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

13B. The method of any preceding B Exemplary Embodiment, wherein the porous polymeric network structure comprises a plurality of interconnected morphologies (e.g., at least one of fibrils, nodules, nodes, open cells, closed cells, leafy laces, strands, nodes, spheres, or honeycombs).

14B. The method of any preceding B Exemplary Embodiment, wherein the porous polymeric network structure is produced by an induced phase separation of a miscible thermoplastic polymer-solvent solution.

15B. The method of Exemplary Embodiment 14B, wherein inducing phase separation includes thermally induced phase separation.

1C. A method of making the polymer matrix composite of any preceding A Exemplary Embodiment, the method comprising:
combining (e.g., mixing or blending) a thermoplastic polymer, a solvent for the thermoplastic polymer, and a plurality of intumescent particles to form a suspension of intumescent particles in a miscible thermoplastic polymer-solvent solution;
inducing phase separation of the thermoplastic polymer from the solvent; and
removing at least a portion of the solvent to provide the polymer matrix composite.

2C. The method of Exemplary Embodiment 1C, wherein inducing phase separation includes at least one of thermally induced phase separation or solvent induced phase separation.

3C. The method of Exemplary Embodiment 1C, wherein the polymer in the miscible thermoplastic polymer-solvent solution has a melting point, wherein the solvent has a boiling point, and wherein combining is conducted above the melting point of the miscible thermoplastic polymer-solvent solution, and below the boiling point of the solvent.

4C. The method of any preceding C Exemplary Embodiment, wherein the polymer in the miscible thermoplastic polymer-solvent solution has a melting point, and wherein inducing phase separation is conducted at less than the melting point of the polymer in the miscible thermoplastic polymer-solvent solution.

5C. The method of any preceding C Exemplary Embodiment, further comprising compressing the polymer matrix composite.

6C. The method of any of Exemplary Embodiments 1C to 4C, further comprising applying vibratory energy to the polymer matrix composite simultaneously with the applying a compressive force.

7C. The method of any preceding C Exemplary Embodiment, wherein the porous polymeric network structure comprises at least one of polyacrylonitrile, polyurethane, polyester, polyamide, polyether, polycarbonate, polyimide, polysulfone, polyethersulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

8C. The method of any preceding C Exemplary Embodiment, wherein the porous polymeric network structure comprises a plurality of interconnected morphologies (e.g., at least one of fibrils, nodules, nodes, open cells, closed cells, leafy laces, strands, nodes, spheres, or honeycombs).

1D. An article (e.g., a thermally initiated fuse and a fire stop device) comprising the polymer matrix composite of any preceding A Exemplary Embodiment.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Air Flow Resistance Test

Air flow resistance was measured using a densometer (obtained as Model 4110 from Gurley Precision Instruments, Troy, NY) with a timer (obtained as Model 4320 from Gurley Precision Instruments). A sample was clamped in the tester. The timer and photo eye were reset and the cylinder was released, allowing air to pass through a 1 square inch (6.5 cm$^2$) circle with a constant force of 4.88 inches (12.4 cm) of water (1215 N/m$^2$). The time to pass 50 mL of air was recorded.

Density and Porosity Test

The density of a sample was calculated using a method similar to ASTM F-1315-17 (2017), "Standard Test Method for Density of a Sheet Gasket Material," the disclosure of which is incorporated herein by reference, by cutting a 47 mm diameter disc, weighing the disc on an analytical balance of suitable resolution (typically 0.0001 gram), and measuring the thickness of the disc on a thickness gauge (obtained as Model 49-70 from Testing Machines, Inc., New Castle, DE) with a dead weight of 7.3 psi (50.3 KPa) and a flat anvil of 0.63 inch (1.6 cm) diameter, with a dwell time of about 3 seconds and a resolution of +/−0.0001 inch. The density was then calculated by dividing the mass by the volume, which was calculated from the thickness and diameter of the sample. With the known densities and weight fractions of the components of the polymer matrix composite, the theoretical density of the polymer matrix composite was calculated by the rule of mixtures. Using the theoretical density and the measured density, the porosity was calculated as:

Porosity=[1−(measured density/theoretical density)]×100.

Volume Expansion Test

A 4.5 cm×1.7 cm×thickness (cm) starting sample was cut using a razor blade. The sample was loaded into a conventional lab oven that had reached an equilibration temperature of 250° C. The sample was placed in the oven for 15 minutes. The sample was removed, allowed to cool, and remeasured. The measured dimensions of the sample were then used to calculate the change in volume before and after expansion.

Example 1

A 120-milliliter (4-ounce) glass jar was charged with 1.49 gram of an ultra-high molecular weight polyethylene (UHMWPE) (obtained under the trade designation "GUR-2126" from Celanese Corporation, Irving, TX), and 20.01 grams of intercalated crystalline graphite (obtained under the trade designation "GRAFGUARD 160-50N" from GrafTech International Holdings Inc., Independence, OH), and shook with an acoustic mixer (obtained under the trade designation "LABRAM RESONATACOUSTIC MIXER" from Resodyn Inc., Butte, MT) at 70% intensity for 1 minute. 14 grams of a low odor kerosene (obtained from Alfa Aesar, Ward Hill, MA) was added to this mixture, and stirred by hand with a spatula until a uniform slurry was obtained. The slurry was applied with a scoop at room temperature (about 25° C.) to a 3-mil (75-micrometer) heat stabilized polyethylene terephthalate (PET) liner (obtained under the trade designation "COATED PET ROLL #33716020500" from 3M Company, St. Paul, MN) then a 3 mil (75 micrometer) heat stabilized PET liner ("COATED PET ROLL #33716020500") was applied on top to sandwich the slurry. The slurry was then spread between the PET liners by using a notch bar set to a gap of 36 mils (914.4 micrometers). The notch bar rails were wider than the PET liner to obtain an effective wet film thickness of 30 mils (762 micrometers). Progressive multiple passes with increasing downward pressure of the notch bar were used to flatten the slurry. The sandwiched, formed slurry was placed on an aluminum tray and placed in a lab oven (obtained under the trade designation "DESPATCH RFD1-42-2E" from Despatch, Minneapolis, MN), at 135° C. (275° F.) for 5 minutes to activate (i.e., to allow the UHMWPE to dissolve into the solvent forming a single phase). The tray with the activated sandwiched, formed slurry was removed from the oven and allowed to air cool to ambient temperature (about 25° C.), forming a solvent filled polymer matrix composite. Both the top and bottom liners were removed exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After evaporation, the polymer matrix composite was removed from the oven, allowed to cool to ambient temperature, and characterized.

Figure 4:
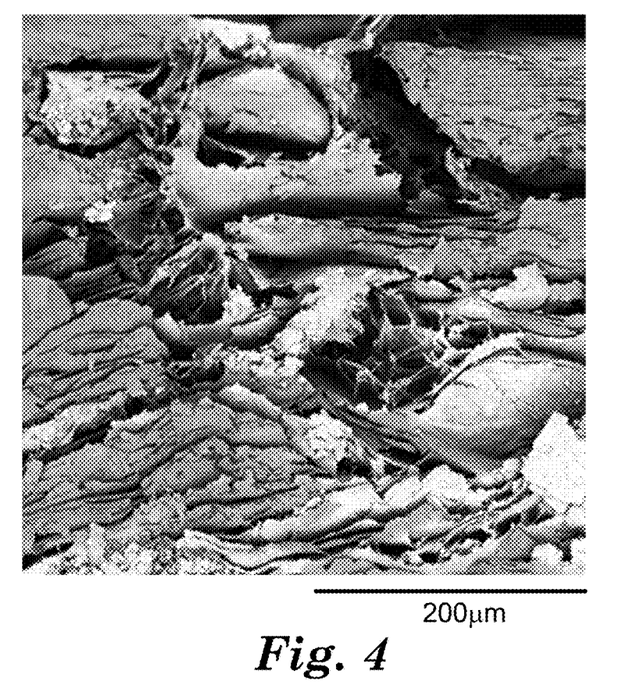
FIGS. 4, 6, and 8 show scanning electron microscope (SEM) micrographs of cross-sections of exemplary polymer matrix composites (Examples 1, 2 and 3, respectively) described herein.

Referring to FIG. 4, a scanning electron microscope (SEM) digital image of a cross-section of the polymer matrix composite taken with a SEM (obtained under the trade designation "PHENOM" from FEI Company, Hillsboro, OR) is shown. The cross-sectional sample was prepared by liquid nitrogen freeze fracturing followed by gold sputter coating with a sputter coater (obtained under the trade designation "EMITECH K550X" from Quorum Technologies, Laughton East Sussex, England).

The resulting polymer matrix composite was 30.9 mils (784.9 micrometers) thick and had a measured density of 0.8556 g/cm$^3$ (as determined by the "Density and Porosity Test"), a porosity of 58.2% (as determined by the "Density and Porosity Test"), and a volume of 615 mm$^3$ (as determined by the "Volume Expansion Test").

The resulting film was then placed in a lab oven for 15 minutes that had reached an equilibrium temperature of 250° C. This caused the intercalated crystalline graphite to expand. The resulting volume expansion was 63.5 times (as determined by the "Volume Expansion Test").

Figure 5A:
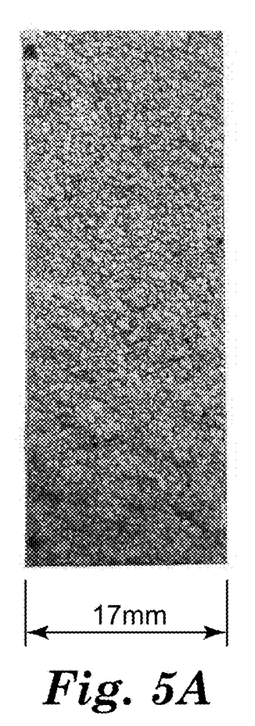
FIGS. 5A, 7A, and 9A, show digital camera pictures of top views of exemplary unexpanded polymer matrix composites (Examples 1, 2 and 3, respectively) described herein.
Figure 5B:
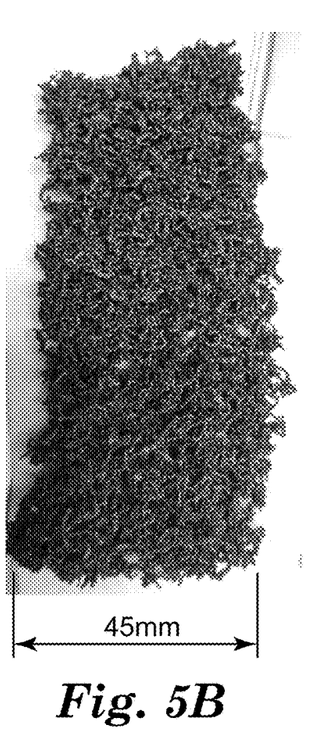
FIGS. 5B, 7B, and 9B, show digital camera pictures of top views of exemplary expanded polymer matrix composites (Examples 1, 2 and 3, respectively) described herein.

Referring to FIGS. 5A (pre-expansion) and 5B (post-expansion) a digital picture of a top view of the polymer matrix composite taken with an optical camera.

Example 2

Example 2 was prepared and tested as described in Example 1, except the slurry was 1.5 gram of UHMWPE ("GUR-2126"), 20.04 grams of expandable graphite (obtained under the trade designation "ASBURY 3772" from Asbury Carbons, Inc., Asbury, NJ), and 19 grams of the low odor kerosene.

The resulting polymer matrix composite was 37.6 mils (955 micrometers) thick, and had a density of 0.710 g/cm$^3$, a porosity of 65.5 and a volume of 765 mm$^3$.

Figure 6:
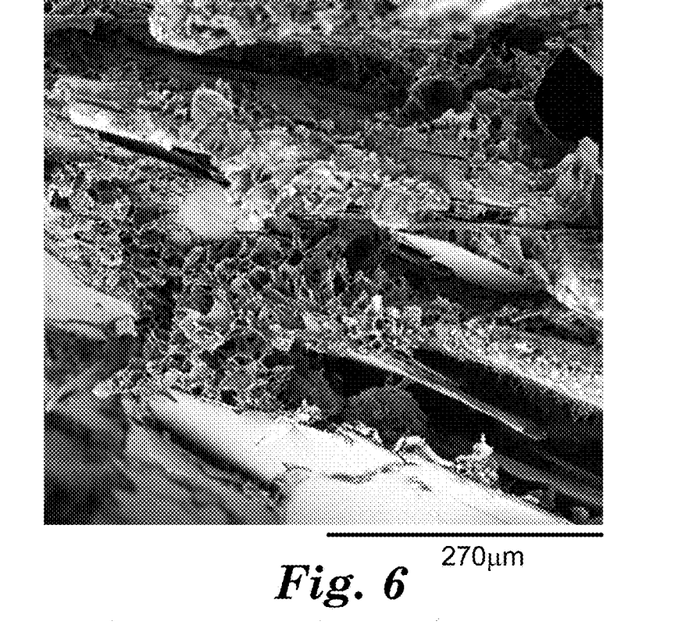

Referring to FIG. 6, a scanning electron microscope (SEM) digital image of a cross-section of the polymer matrix composite is shown.

The resulting film was then placed in a lab oven for 15 minutes that had reached an equilibrium temperature of 250° C. This caused the intercalated crystalline graphite to expand. The resulting volume expansion was 20.6 times.

Figure 7A:
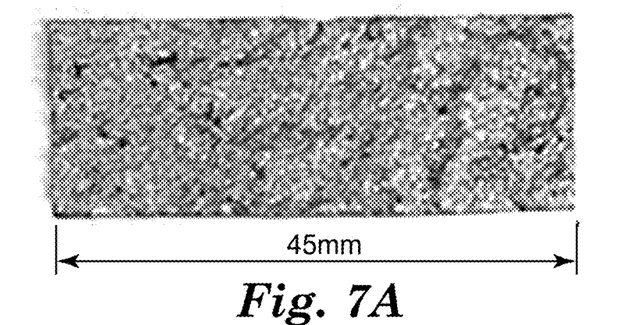
Figure 7B:
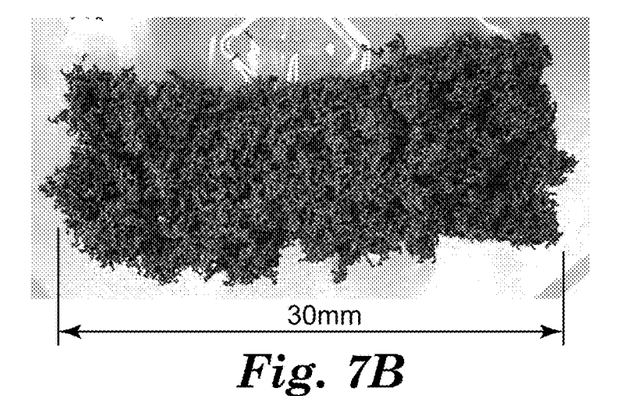

Referring to FIGS. 7A (pre-expansion) and 7B (post-expansion) a digital picture of a top view of the polymer matrix composite taken with an optical camera.

Example 3

Example 3 was prepared and tested as described in Example 1, except the slurry was 3 grams of UHMWPE ("GUR-2126"), 35.5 grams of expandable vermiculite (obtained under the trade designation "TYPE "D" VERMICULITE" from 3M Company), and 30 grams of the low odor kerosene.

Figure 8:
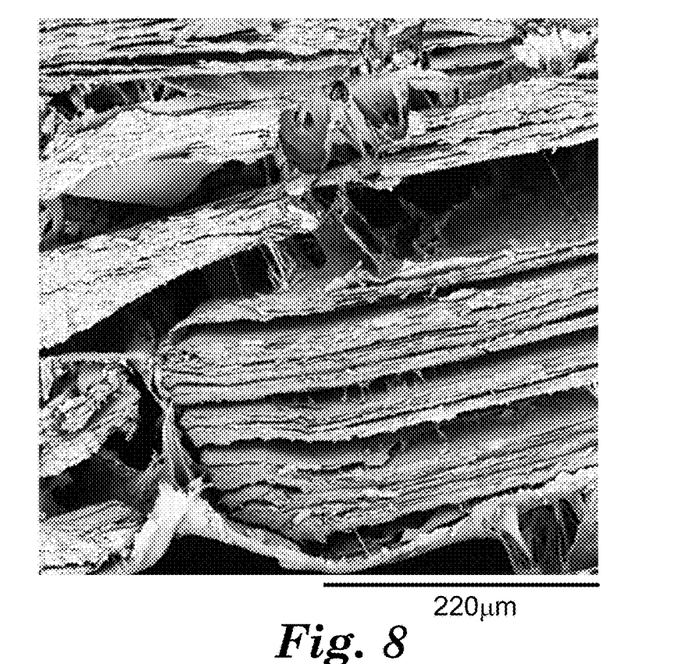

Referring to FIG. 8, a SEM digital image of a cross-section of the polymer matrix composite is shown.

The resulting polymer matrix composite was 33.8 mils (858.5 micrometers) thick, and had a density of 1.045 g/cm³, a porosity of 52.7 and a volume of 661 mm³.

The resulting film was then placed in a lab oven for 15 minutes that had reached an equilibrium temperature of 350° C. This caused the intercalated crystalline graphite to expand. The resulting volume expansion was 5.6 times.

Figure 9A:
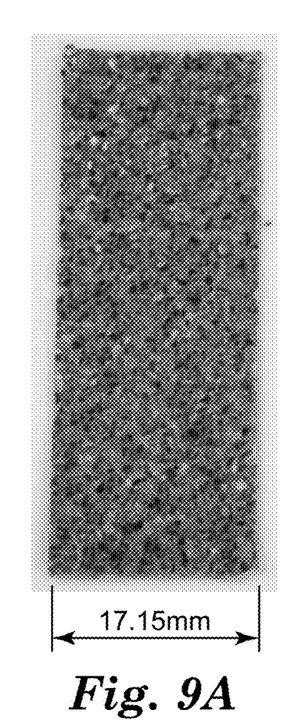
Figure 9B:
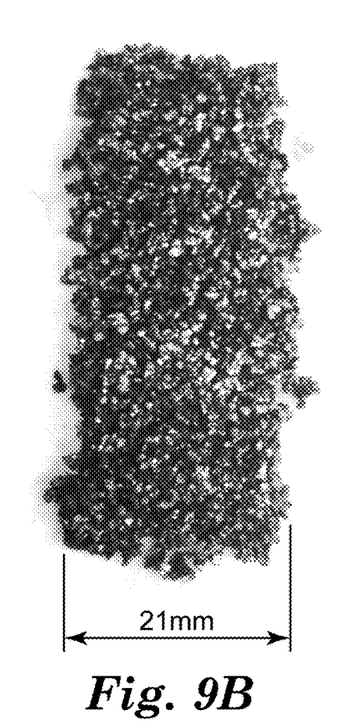

Referring to FIGS. 9A (pre-expansion) and 9B (post-expansion) a digital picture of a top view of the polymer matrix composite taken with an optical camera.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A polymer matrix composite comprising:
a porous polymeric network structure; and
a plurality of intumescent particles distributed within the polymeric network structure, wherein the intumescent particles are present in a range from 15 to 99 weight percent, and wherein the polymer matrix composite volumetrically expands at least 2 times its initial volume when exposed to at least one temperature greater than 135° C.

2. The polymer matrix composite of claim 1, wherein the porous polymeric network structure comprises open cell pores.

3. The polymer matrix composite of claim 1, wherein the porous polymeric network structure comprises a phase-separated plurality of interconnected morphologies.

4. The polymer matrix composite of claim 1, wherein the polymer matrix composite has a density of at least 0.3 g/cm³.

5. The polymer matrix composite of claim 1, wherein the polymer matrix composite has a density in a range from 0.3 to 2.3 g/cm³.

6. The polymer matrix composite of claim 1, wherein the polymer matrix composite has a porosity at least 5 percent.

7. The polymer matrix composite of claim 1, wherein the polymer matrix composite has a porosity in the range from 10 to 80 percent.

8. The polymer matrix composite of claim 1, wherein the intumescent particles comprise at least one of sodium silicate, intercalated graphite, aluminum hydroxide, magnesium hydroxide, ammonium polyphosphate, clay, or vermiculite.

9. The polymer matrix composite of claim 1, wherein the intumescent particles comprise first and second, different intumescent particles.

10. The polymer matrix composite of claim 1, wherein the intumescent particles have an average particle size in a range from 500 nanometers to 7000 micrometers.

11. The polymer matrix composite of claim 1, wherein the porous polymeric network structure comprises at least one of polyurethane, polyester, polyamide, polyether, polycarbonate, polyimide, polysulfone, polyethersulfone, polyphenylene oxide, polyacrylate, polymethacrylate, polyacrylonitrile, polyolefin, styrene or styrene-based random and block copolymer, chlorinated polymer, fluorinated polymer, or copolymers of ethylene and chlorotrifluoroethylene.

12. The polymer matrix composite of claim 1, wherein the porous polymeric network structure comprises at least one of an ultra-high molecular weight polypropylene or an ultra-high molecular weight polypropylene.

13. The polymer matrix composite of claim 1, wherein the porous polymeric network structure comprises a polymer having a number average molecular weight in a range from of $5 \times 10^4$ to $1 \times 10^7$ g/mol, and wherein the polymer matrix composite is in the form of a layer having a thickness in a range from 50 to 7000 micrometers.

14. The polymer matrix composite of claim 1, wherein the intumescent particles are present in a range from 75 to 98 weight percent, based on the total weight of intumescent particles and the porous polymeric network structure.

15. The polymer matrix composite of claim 1, wherein the polymer matrix composite has a first and a second opposed major surface, wherein the first major surface is nonplanar.

16. The polymer matrix composite of claim 1, wherein the polymer matrix composite has a first and a second opposed major surface, and wherein the first major surface has first protrusions extending outwardly from the first major surface.

17. The polymer matrix composite of claim 1, further comprising a reinforcement material.

18. The polymer matrix composite of claim 17, wherein the reinforcement material comprises at least one of fibers, strands, nonwovens, woven materials, fabrics, mesh, and films.

19. An apparatus comprising the polymer matrix composite of claim 1.

20. The apparatus of claim 19, wherein the apparatus is a thermally initiated fuse, or a fire stop device.

* * * * *